July 11, 1961  F. E. GOLDING  2,992,373
ELECTRICAL DISPLACEMENT MEASURING SERVOSYSTEM
Filed Dec. 15, 1958
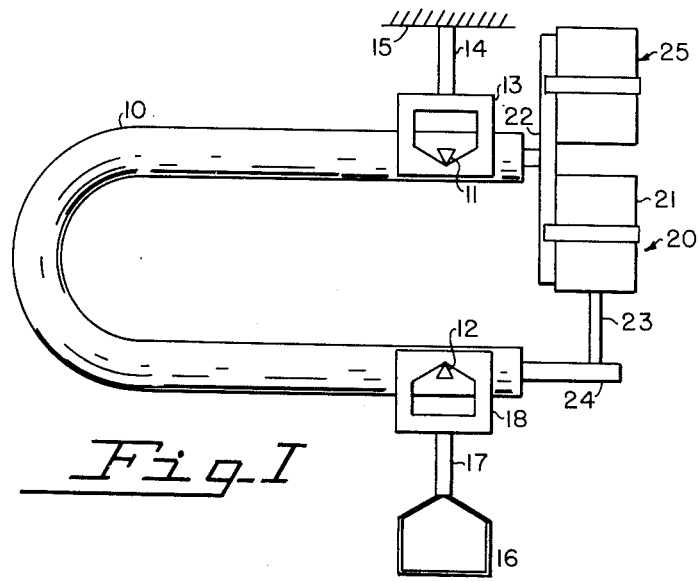
_Fig. I_
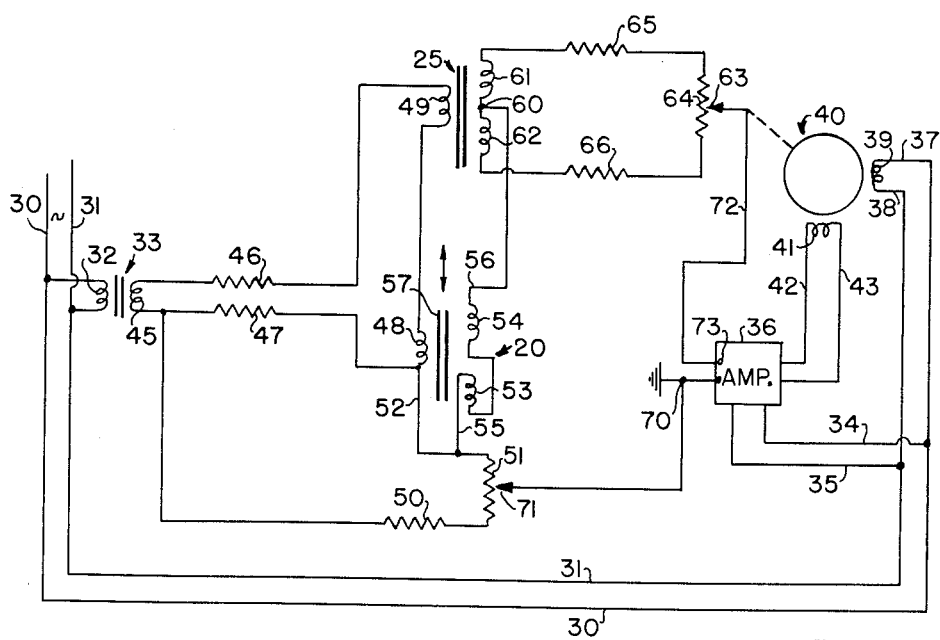
_Fig. II_
INVENTOR.
FRANK E. GOLDING
BY
Marshall, Marshall & Yeasting
ATTORNEYS

United States Patent Office 2,992,373
Patented July 11, 1961

2,992,373
ELECTRICAL DISPLACEMENT MEASURING SERVOSYSTEM
Frank E. Golding, Toledo, Ohio, assignor to Toledo Scale Corporation, Toledo, Ohio, a corporation of Ohio
Filed Dec. 15, 1958, Ser. No. 780,617
6 Claims. (Cl. 318—28)

This invention relates to electrical displacement measuring equipment and in particular to means for increasing the accuracy of such equipment.

Electro-mechanical equipment is often used for measuring small displacements and remotely indicating such measurements. One of the principal difficulties in using such equipment for precision measurements is the lack of stability of the equipment when subjected to changes in temperature, voltage, and other environmental conditions. Another problem is to secure equipment that is sufficiently linear in its response so that accurate measurements may be made over a wide range of values.

Linear differential transformers, a movable core transformer in which the position of the core varies the coupling between a primary winding and each of a pair of secondary windings, are often used either singly or in pairs to indicate the displacement of a member from a reference position and to control equipment for causing a second member to move similarly to the first. When two such transformers are employed, one as a transmitter and the other as a receiver, and the movable core of the receiver is mechanically moved to maintain the output voltages of the two transformers in balance with each other quite accurate results may be obtained because a non-linear error of one transformer is corrected by a similar error in the second transformer. However, it is often inconvenient to use a second transformer as a receiver and in many types of equipment a precision potentiometer is a preferred receiver element.

The principal object of this invention is to provide an improved circuit arrangement in which the inherent precision of a differential transformer may be maintained even though a precision potentiometer is employed as a receiver element.

Another object of the invention is to employ a movable core transformer between a source of power and a potentiometer that is used in equipment to balance the output voltage of a measuring movable core transformer.

A still further object of the invention is to provide a circuit for measuring the output voltage of a movable core transformer that includes a second transformer subjected to the same environment as the first and serving as a transducer between a power source and a potentiometer used to balance the voltage of the first transformer.

More specific objects and advantages are apparent from the following description of a preferred form of the invention.

According to the invention a second movable core transformer similar in physical characteristics to a first or measuring transformer is employed as a transducer between a source of power energizing the first transformer and a potentiometer located at a recording mechanism and used to balance the signal voltage generated in the first or measuring transformer. The second transformer serves as a compensating unit to vary the excitation of the potentiometer in accordance with the characteristics of the measuring transformer.

A preferred form of the invention is illustrated in the accompanying drawings.

In the drawings:

FIGURE I is a generally schematic illustration of a simple weighing device employing a spring load supporting element and a linear differential transformer as a spring deflection measuring instrument.

FIGURE II is a schematic circuit diagram of the essential elements of the measuring circuit for remotely indicating the deflection of the measuring spring illustrated in FIGURE I.

These specific figures and the accompanying description are intended merely to illustrate the invention and not to impose limitations on its scope.

In the arrangement shown in FIGURE I a U-shaped spring steel bar 10 is equipped near the ends of its tines with laterally extending knife edges 11 and 12 by means of which load may be applied to the spring steel bar 10 tending to spread its tines apart. The upper knife edge 11 is carried in a V-bearing 13 that is suspended by a rod 14 from a rigid support 15. Likewise, a load receiver 16 is suspended by a rod 17 from a V-bearing 18 resting on the knife edge 12.

While the knife edges 11 and 12 are shown oriented to receive tension loads they may just as well be oriented reversely to receive compression loads.

The deflection of the ends of the tines of the U-shaped spring steel bar 10 is measured by a linear differential transformer 20 having a case 21 rigidly attached to a bracket 22 attached to the upper tine of the spring steel bar 10 and having an extension 23 of its core connected to a finger 24 extending from the lower tine of the U-shaped spring steel bar 10. Thus, any relative motion or displacement of one tine with respect to the other in response to load is transferred to the linear differential transformer 20 so as to move its core relative to the transformer itself.

A second transformer 25 physically similar to the transformer 20 except that its core is held in fixed adjusted position in the transformer, is preferably mounted on an upward extension of the bracket 22 so that the second transformer is subjected to the same environmental conditions as is the measuring transformer 20. If temperature errors are not significant the second transformer 25 may be separately mounted.

The arrangement of the circuit elements and their connection for electrically measuring the deflection of the spring steel bar 10 is illustrated in FIGURE II. As shown, the equipment is energized from alternating current supply leads 30 and 31 that are connected to supply current to a primary winding 32 of an isolation transformer 33; are connected through branch leads 34 and 35 to an amplifier 36; and are connected through leads 37 and 38 to a power field 39 of a balancing motor 40. The balancing motor 40 has a control field 41 that is energized through leads 42 and 43 from the amplifier 36.

The isolation transformer 33 supplies current through its secondary winding 45, series resistors 46 and 47 to a series arrangement of primary windings 48 and 49 of the transformers 20 and 25, respectively. In this circuit the resistor 46 preferably has a resistance in the order of 1600 ohms while the resistor 47 has a resistance in the order of 25 ohms.

To obtain a correction voltage proportional to the current flow in the primary windings 48 and 49 a by-pass circuit around the 25 ohm resistor 47 is provided through a resistor 50 and potentiometer 51. One end of the potentiometer 51 is connected through a lead 52 to the junction between the resistor 47 and the primary winding of the transformer 20. Preferably the resistor 50 is in the order of 10,000 ohms while the potentiometer 51 has a resistance of approximately 200 ohms.

The measuring transformer 20 has its secondary windings 53 and 54 connected in series opposing so that the voltage appearing between a first terminal 55 and a second terminal 56 corresponds to the difference in the voltages generated in the individual windings. The output voltage of the transformer 20 appearing between terminals 55 and 56 varies according to the position of a movable transformer core 57 of the transformer that is supported on the extension 23 and moves according to the displacement to be indicated. Movement of this core 57 changes the coupling between the primary winding 48 and the secondary windings 53 and 54 so that as the core moves from a central position the voltage in one of the windings increases while the voltage in the other winding decreases thus giving a difference voltage that is proportional to the movement of the core 57 from its central position.

The output voltage of the transformer 20 is balanced against a reference voltage that is developed between a center tap 60 between secondary windings 61 and 62 of the transformer 25 and a movable contact 63 of a potentiometer 64 that is energized from the output voltage of the secondary windings 61 and 62 of the second transformer 25. Since the voltage developed across the series aiding secondary windings 61 and 62 is much greater than the differential voltage produced by the transformer 20 resistors 65 and 66 are inserted in series with the leads to the potentiometer 64 so that the voltage across the potentiometer 64 has a value substantially equal to the maximum signal voltage obtained from the transformer 20. The actual value of these resistors 65 and 66 is in the order of 50,000 ohms each for a potentiometer resistance of approximately 10,000 ohms.

The output voltage of the measuring transformer 20 together with the reference voltage obtained between the terminal point 60 of the transformer 25 and the movable contact 63, and a small out-of-phase balancing voltage from the potentiometer 51 are added in the input circuit to the amplifier 36. This input circuit may be traced from a grounded lead 70 of the amplifier 36, through a movable contact 71 of potentiometer 51, a lead 55, the opposed secondary windings 53 and 54 of the transformer 20 to the junction point 60 between the series aiding windings 61 and 62 of the transformer 25 and thence through the parallel circuit including resistors 65 and 66 to the potentiometer 64 and through its movable contact 63 and lead 72 to an input terminal 73 of the amplifier 36. The amplifier is arranged to drive the balancing motor 40 in such direction as to move the movable contact 63 in a direction to reduce the voltage in the input circuit. When at rest with the input voltage reduced to zero the position of the movable contact 63 corresponds to the displacement of the core 57 of the movable transformer 20.

In this arrangement the voltage developed in the potentiometer 51 is substantially in quadrature, that is 90° out-of-phase, with the voltages developed in the secondary windings of the transformers 20 and 25. Since the output or differential voltage of the transformer 20 depends to a small extent upon the temperature of the elements of the transformer 20 and to a smaller extent on the amplitude of the exciting current it is necessary, for high accuracy, that the exciting voltage to the balancing potentiometer 64 be similarly affected by temperature and voltage. To obtain this compensation transformer 25 is made of substantially similar characteristics to the measuring transformer 20 and is excited in a similar way, that is by causing the primary currents of the two transformers to be identical, so that the output voltage of the transformer 25 also varies similarly to that of the transformer 20 in response to changes in temperature or exciting power. Another factor of importance is that the voltage across the balancing potentiometer 64 be exactly in phase with the unbalance voltage or signal voltage appearing at the output of the transformer 20. This is accomplished in this circuit since the characteristics of the transformer 25 are precisely similar to the characteristics of the measuring transformer 20. Therefore, at the balance point the residual voltage is extremely low and may be balanced by a very small voltage developed in the potentiometer 51.

In order that the transformer 25 shall accurately compensate for errors introduced by environmental changes at the transformer 20 the transformer 25 is preferably mounted closely adjacent the transformer 20 but electromagnetically shielded therefrom. The two transformers are thus continually subjected to the same temperature and other disturbing environmental conditions.

This circuit thus makes it possible to employ precision potentiometers as indicating or receiving elements in a remote indicating system without losing the accuracy inherent in the transmitting linear differential transformer, the movable core transformer 20, and thus makes possible a high precision remote indicating system for indicating small deflections or displacements of the spring steel bar 10 employed as a force measuring device.

Various modifications may be made in the details of the circuits or construction of the displaceable elements without departing from the spirit and scope of the invention.

Having described the invention, I claim:

1. In an electrical mechanism for remotely indicating the physical displacement of a member, in combination, a first movable core transformer the core of which moves relative to the transformer according to the displacement to be indicated, a second movable core transformer the core of which is held in adjusted position, each of said transformers having a primary winding and a pair of secondary windings, means for energizing the primary windings, said secondary windings of the second transformer being connected in series aiding, a potentiometer connected across the secondaries of the second transformer, a movable contact on the potentiometer, a motor for moving the movable contact, an amplifier for driving the motor, and an input circuit for the amplifier that includes in series the secondary windings of the first transformer connected in series opposition and the circuit between a connection between the windings of the second transformer and the movable potentiometer contact.

2. In an electrical mechanism for remotely indicating the physical displacement of a member, in combination, a first movable core transformer having a primary winding and a pair of secondary windings connected in series opposing, a core in the transformer that moves relative to the transformer according to the displacement to be indicated and that varies the secondary voltage according to its position, a second transformer physically similar to the first, means for similarly energizing the primaries of the transformers, a potentiometer connected to and energized by the sum of the secondary voltages of the second transformer, a movable contact on the potentiometer, means for moving the potentiometer contact to vary the voltage between said movable contact and the junction of the secondary windings, and a utilization circuit responsive to the difference between said last mentioned voltage and the voltage output of the first transformer.

3. A circuit according to claim 2 having means responsive to the difference voltage arranged to move said movable contact to reduce the difference voltage.

4. In an electrical mechanism for remotely indicating a physical displacement of a member, in combination, a movable core transformer the core of which moves relative to the transformer according to the displacement to be indicated, a second transformer similar to the first, a primary winding and a pair of secondary windings on each transformer, means for similarly energizing the primaries of the transformers, a potentiometer that is energized from the secondary windings of the second transformer, said potentiometer having a movable contact, said first transformer having its secondaries connected in opposition whereby its output voltage varies with the position of its core, means for comparing the output voltages of the first transformer with the voltage between said secondary windings of the second transformer and the potentiometer contact, and means adapted to move said contact to reduce the difference between said voltages.

5. In an electrical mechanism for remotely indicating a physical displacement of a member, in combination, a first movable core transformer having a primary winding and a pair of secondary windings, a second transformer similar to the first transformer, circuit means connecting said primary windings in series to a source of power, a potentiometer connected across a series combination of the secondary windings of the second transformer, a movable contact on the potentiometer, the voltage between the midpoint of said secondary windings and said contact providing a reference voltage, the secondary windings of the first transformer being connected in series opposition to provide a signal voltage, means providing a quadrature voltage proportional to and in phase with the current flow in said primary windings, means for adding said voltages, and means responsive to the sum of said voltages arranged to move said contact in a direction to reduce such sum.

6. An electrical mechanism according to claim 5 in which both transformers are mounted closely adjacent each other to be subjected to the same environment.

References Cited in the file of this patent
UNITED STATES PATENTS

| | | |
|---|---|---|
| 2,564,221 | Hornfeck | Aug. 14, 1951 |
| 2,611,812 | Hornfeck | Sept. 23, 1952 |